Oct. 11, 1932.  H. A. CHERRY  1,882,118
TIRE CASING REMOVER
Filed Feb. 1, 1932
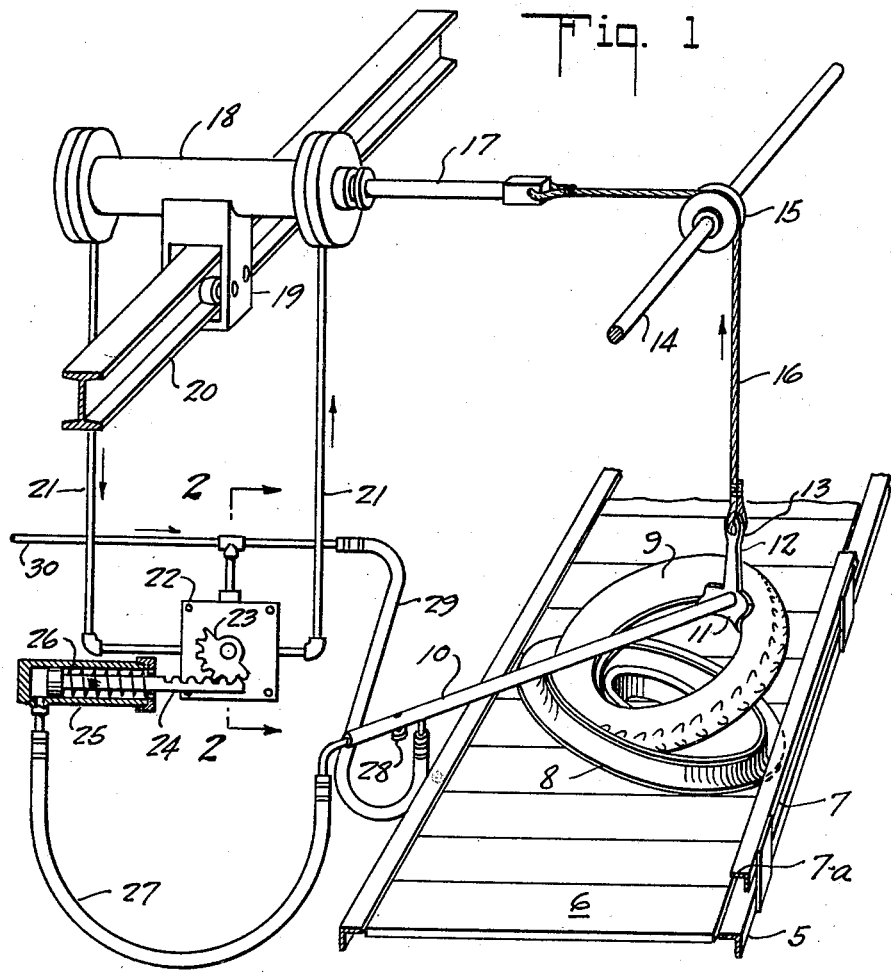
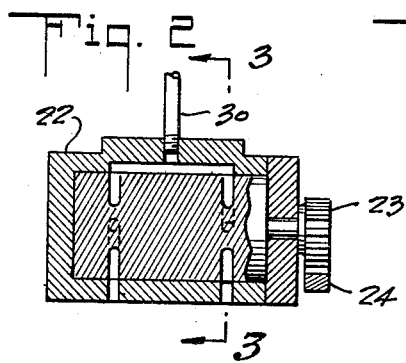
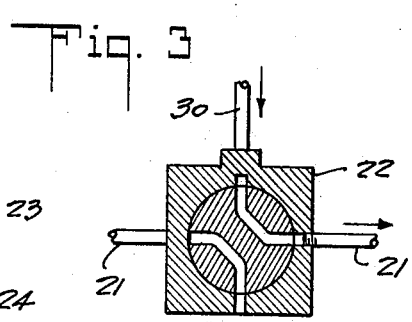
Inventor
Homer A. Cherry
By Ernest L. Wallace
Attorney Patented Oct. 11, 1932

1,882,118

UNITED STATES PATENT OFFICE

HOMER A. CHERRY, OF MONTEBELLO, CALIFORNIA

TIRE CASING REMOVER

Application filed February 1, 1932. Serial No. 590,060.

This invention relates to a device for removing tire casings from molds. It is well known to those familiar with the art of tire manufacture, that after curing of the tire in sectional molds and separation of the upper mold section from the lower section, the tire casing sticks to the lower section. It is necessary to pry the tire loose from the lower mold section. It is the practice in tire manufacture to provide a continuously moving conveyor for the sectional molds containing the vulcanized tires. The molds are broken during their travel on the conveyor and the upper sections separated from the lower sections and the tires. Men are positioned along the conveyor to pry the tires loose from the lower sections by crow bars and like tools. This is an unsatisfactory method requiring labor on the part of several men. After removal of the cured casing, a green casing is inserted in the lower section and the top section replaced. By the use of such methods it may happen that the casing is not removed until the mold has reached a point in its travel inconvenient for insertion of a green tire. Other disadvantages will be apparent to those skilled in the art.

The present invention has for its primary object the provision of a power actuated mechanism for removing the tire casing. Another object of the invention is to provide details of construction whereby the device is adaptable for expeditious operation, is selectively controllable and may follow the conveyor in its travel.

These objects together with other objects and corresponding accomplishments are obtained by the embodiment of my invention illustrated in the accompanying drawing, in which:—

Fig. 1 is a perspective view partly in section showing the associated parts of the device; Fig. 2 is a section on an enlarged scale as seen on the line 2—2 of Fig. 1; and Fig. 3 is a section as seen on the line 3—3 of Fig. 2.

Referring more particularly to the drawing, 5 indicates the base of a conveyor having a travelling platform 6. Attached to the base 5 at the sides of the platform are angle bars 7 having horizontal legs 7a directed inwardly over the platform so as to form overhanging ledges. These ledges are adapted for abutment by lower sections of tire molds. There is shown on the platform the lower section 8 of a tire mold. A tire casing 9 has been vulcanized in the mold and the top section of the mold removed. This top section is not shown in the drawing. It is a common practice to break apart the molds and to remove the top sections for use in conjunction with the lower sections when the green tires are inserted therein. The tire casings stick to the molds due to partial vacuum and other well known causes. Considerable force is required to remove a casing from the mold.

In order to remove the casing, I have provided a tire engager consisting of a handle 10 having at the end thereof an arcuate channel 11 forming a hook which may be engaged with the bead of the tire casing. Extending laterally from the hook 11 is a connector bar 12 having an eye 13.

Extending parallel to the path of travel of the conveyor is a shaft 14 upon which an idler pulley 15 is mounted so that it may slide along the shaft as well as rotate. A cable 16 is attached at one end to connector 12 and at its other end to the piston rod 17 operating in an air cylinder 18. Any flexible line, such as a chain may be substituted for the cable. The air cylinder is double acting and is shown mounted upon a carriage 19 riding upon a rail 20 extending parallel to the conveyor.

The ends of the air cylinder are connected by pipes 21 to a valve 22 for selectively supplying air under pressure to one end of the cylinder and connecting the other to an exhaust. The valve 22 may be of any conventional type and is herein shown as of the rotary type having a segmental gear 23 meshing with a rack 24. A spring tends to hold the valve in position so that air will be supplied to cylinder 18 causing the piston rod to be projected with the cable 16 in its lower position. The rack 24 is connected to the plunger of a single acting air motor 25. A spring 26 urges the plunger to inner position. A hose or flexible tube 27 is connected to the motor 25 for supplying air thereto so as to project the rack and operate the valve 22 to cause the cable 16 to be raised. The hose 27 is connected to the handle 10 of the engager and a button operated valve 28 on the handle controls the supply of air under pressure from hose 29 to hose 27. The arrangement may be such that upon depression of the button 28 air under pressure is supplied to the motor 25. When released the hose 27 is connected to the atmosphere. This is a conventional type of button operated valve and the details are not shown or described. The air intake hose 29 is connected to the main air line 30 which also supplies air to the valve 22.

In the operation of the device, a man grasps the handle of the engager and places the hook 11 under the upper bead of the tire casing 9, at the same time disposing the tire mold section 8 under the ledge of bar 7. Thereupon, he depresses the control button 28 causing air to be admitted to cylinder 18 and the piston rod 17 to be retracted. This elevates the cable 16 and by reason of the engagement of the hook with the tire casing, the latter is pulled from the mold. Obviously the operator maintains the hook in engagement with the casing and the air cylinder and cable may follow the mold as it moves with the conveyor.

What I claim is:—

1. A device for separating a tire from a tire mold section comprising a hand manipulated tire engager having a handle, a channel hook at one end of the handle extending transversely thereof for engagement with the bead of a tire; a line secured to said engager and extending laterally therefrom, power actuated means to which said line is attached for selectively moving said line and thereby moving said tire engager laterally; and a manually operable control for said power actuated means, said control being located on said handle.

2. A device for separating a tire from a tire mold section comprising a hand manipulated tire engager having a handle, a channel hook at one end of the handle extending transversely thereof for engagement with the bead of a tire, a connector extending laterally of said hook and handle; a line secured to said connector, power actuated means to which said line is attached for selectively moving said line and thereby moving said tire engager laterally; and a manually operable control for said power actuated means, said control being located on said handle.

3. The combination with a conveyor structure having an overhanging ledge adapted to be abutted by an edge of a lower tire mold section; a device for separating a tire from a tire mold section comprising a hand manipulated tire engager having a handle, a hook at one end of the handle for engagement with the bead of a tire; a line secured to said engager, power actuated means for selectively moving said line and thereby moving said tire engager laterally; and a manually operable control for said power actuated means.

4. The combination with a conveyor structure having an overhanging ledge adapted to be abuted by an edge of a lower tire mold section; a device for separating a tire from a tire mold section comprising a hand manipulated tire engager having a handle, a hook at one end of the handle for engagement with the bead of a tire; a line secured to said engager, power actuated means for selectively moving said line and thereby moving said tire engager laterally; and a manually operable control for said power actuated means, said control being located on said handle.

5. The combination with a conveyor structure having an overhanging ledge adapted to be abutted by an edge of a lower tire mold section; a device for separating a tire from a tire mold section comprising a hand manipulated tire engager having a handle, a channel hook at one end of the handle extending transversely thereof for engagement with the bead of a tire, a connector extending laterally of said hook and handle; a line secured to said connector, a cylinder and piston operable therein by fluid under pressure, said line being attached to said piston for selectively moving said line and thereby moving said tire engager laterally; and a manually operable control for fluid supplied to said cylinder.

6. The combination with a conveyor structure having an overhanging ledge adapted to be abutted by an edge of a lower tire mold section; a device for separating a tire from a tire mold section comprising a hand manipulated tire engager having a handle, a channel hook at one end of the handle extending transversely thereof for engagement with the bead of a tire, a connector extending laterally of said hook and handle; a line secured to said connector, a cylinder and piston operable therein by fluid under pressure, said line being attached to said piston for selectively moving said line and thereby moving said tire engager laterally; and a manually operable control for fluid supplied to said cylinder, said control being located on said handle.

7. The combination with a conveyor structure having an overhanging ledge adapted to be abutted by an edge of a lower tire mold section; a device for separating a tire from a tire mold section comprising a hand manipulated tire engager having a handle, a hook at one end of the handle for engagement with the bead of a tire; a line secured to said engager, power actuated means for selectively moving said line and thereby moving said tire engager laterally; a manually operable control for said power actuated means; and a travelling carriage for supporting said power actuated means and cable whereby the latter may follow said conveyor.

8. The combination with a conveyor structure having an overhanging ledge adapted to be abutted by an edge of a lower tire mold section; a device for separating a tire from a tire mold section comprising a hand manipulated tire engager having a handle, a hook at one end of the handle for engagement with the bead of a tire; a line secured to said engager, power actuated means for selectively moving said line and thereby moving said tire engager laterally; a manually operable control for said power actuated means, said control being located on said handle; and a travelling carriage for supporting said power actuated means and cable whereby the latter may follow said conveyor.

9. The combination with a conveyor structure having an overhanging ledge adapted to be abutted by an edge of a lower tire mold section; a device for separating a tire from a tire mold section comprising a hand manipulated tire engager having a handle, a channel hook at one end of the handle extending transversely thereof for engagement with the bead of a tire, a connector extending laterally of said hook and handle; a line secured to said connector, a cylinder and piston operable therein by fluid under pressure, said line being attached to said piston for selectively moving said line and thereby moving said tire engager laterally; a manually operable control for fluid supplied to said cylinder; and a travelling carriage for supporting said cylinder and line whereby the latter may follow said conveyor.

10. The combination with a conveyor structure having an overhanging ledge adapted to be abutted by an edge of a lower tire mold section; a device for separating a tire from a tire mold section comprising a hand manipulated tire engager having a handle, a channel hook at one end of the handle extending transversely thereof for engagement with the bead of a tire, a connector extending laterally of said hook and handle; a line secured to said connector, a cylinder and piston operable therein by fluid under pressure, said line being attached to said piston for selectively moving said line and thereby moving said tire engager laterally; a manually operable control for fluid supplied to said cylinder, said control being located on said handle; and a travelling carriage for supporting said cylinder and line whereby the latter may follow said conveyor.

In witness that I claim the foregoing I have hereunto subscribed my name this 25 day of January, 1932.

HOMER A. CHERRY.